US012617535B2

(12) United States Patent
Armero

(10) Patent No.: US 12,617,535 B2
(45) Date of Patent: May 5, 2026

(54) AIRCRAFT AIR CONDITIONING DEVICE COMPRISING A LARGE-CAPACITY MIXER, METHOD FOR INSTALLING SUCH A DEVICE AND AIRCRAFT EQUIPPED WITH SUCH AN AIR CONDITIONING DEVICE

(71) Applicant: Airbus Operations SAS, Toulouse (FR)

(72) Inventor: Bernardo Armero, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 297 days.

(21) Appl. No.: 18/347,680

(22) Filed: Jul. 6, 2023

(65) Prior Publication Data

US 2024/0017837 A1 Jan. 18, 2024

(30) Foreign Application Priority Data

Jul. 13, 2022 (FR) ....................................... 2207249

(51) Int. Cl.
　　*B64D 13/06* (2006.01)
　　*B01F 23/10* (2022.01)
(52) U.S. Cl.
　　CPC .............. *B64D 13/06* (2013.01); *B01F 23/10* (2022.01); *B01F 23/19* (2022.01); *B64D 2013/0688* (2013.01)
(58) Field of Classification Search
　　CPC ............ B64D 13/06; B64D 2013/0666; B64D 2013/0688; B01F 23/10; B01F 23/19; B01F 23/191
　　See application file for complete search history.

(56) References Cited

U.S. PATENT DOCUMENTS

| | | | |
|---|---|---|---|
| 4,517,813 A | 5/1985 | Eggebrecht et al. | |
| 4,942,739 A | 7/1990 | Uda et al. | |
| 5,634,964 A | 6/1997 | Army, Jr. et al. | |
| 2009/0017742 A1 | 1/2009 | Diaks | |
| 2017/0268810 A1* | 9/2017 | Army ..................... | B64D 13/06 |

FOREIGN PATENT DOCUMENTS

EP 4008636 A1 6/2002

OTHER PUBLICATIONS

French Search Report for French Patent Application No. 2207249 dated Feb. 7, 2023; priority document.

* cited by examiner

*Primary Examiner* — Tavia Sullens
(74) *Attorney, Agent, or Firm* — Greer Burns & Crain Ltd.

(57) ABSTRACT

An air conditioning device includes a mixer configured to mix the air withdrawn from a conditioned-air zone with the regulated air. This mixer includes a body, at least one withdrawn-air inlet connected to a withdrawing circuit and positioned in the vicinity of the lower end of the body, and at least one air outlet connected to a distribution circuit and positioned in the vicinity of the upper end of the body, at least one orifice from among the withdrawn-air inlet and the air outlet being positioned between the lower and upper ends, in the vicinity of one of the lower and upper ends that is closed off by a transverse wall.

10 Claims, 7 Drawing Sheets

AIRCRAFT AIR CONDITIONING DEVICE COMPRISING A LARGE-CAPACITY MIXER, METHOD FOR INSTALLING SUCH A DEVICE AND AIRCRAFT EQUIPPED WITH SUCH AN AIR CONDITIONING DEVICE

CROSS-REFERENCES TO RELATED APPLICATIONS

This application claims the benefit of the French patent application No. 2207249 filed on Jul. 13, 2022, the entire disclosures of which are incorporated herein by way of reference.

FIELD OF THE INVENTION

The present application relates to an aircraft air conditioning device comprising a large-capacity mixer, to a method for installing such an air conditioning device, and to an aircraft equipped with the air conditioning device.

BACKGROUND OF THE INVENTION

According to one embodiment visible in FIGS. 1 and 2, an aircraft 10 comprises a fuselage 12, which extends from a nose cone 12.1 as far as a tail cone 12.2, and a floor 14 which splits the interior of the fuselage 12 into an upper zone 16.1 situated above the floor 14 and a lower zone 16.2 situated below the floor 14.

For the remainder of the description, a longitudinal direction X corresponds to a direction which passes approximately through the nose cone 12.1 and the tail cone 12.2 and which is substantially horizontal when the aircraft is on the ground. A transverse plane is a plane perpendicular to the longitudinal direction. A transverse and horizontal direction Y is horizontal and perpendicular to the longitudinal direction X. A transverse and vertical direction Z is vertical and perpendicular to the longitudinal direction X.

The aircraft 10 comprises at least one conditioned-air zone 18, such as a passenger cabin situated in the upper zone 16.1, for example, and an air conditioning device 20 making it possible to regulate, to determined conditions, the air present in the conditioned-air zone 18.

This air conditioning device comprises a withdrawing circuit 22 configured to withdraw air present in the conditioned-air zone 18, a mixer 24 configured to mix the air withdrawn from the conditioned-air zone 18 with regulated air coming from a regulated-air source, and a distribution circuit 26 configured to re-inject the air exiting the mixer 24 into the conditioned-air zone 18.

According to one embodiment visible in FIG. 2, the mixer 24 is positioned in the lower zone 16.2, below the floor 14. The mixer 24 comprises:

- a substantially cylindrical body 28, positioned vertically, having a lower end 28.1 oriented toward the fuselage 12 and an upper end 28.2 oriented toward the floor 14;
- a collector 30 positioned in the continuation of the lower end 28.1 of the body 28, below the latter, in the form of an inverted Y having two air inlets 30.1, 30.2 that are connected to the withdrawing circuit 22 and that are situated below the lower end 28.1 of the body 28;
- two exhausts 32, 32' positioned in the continuation of the upper end 28.2 of the body 28, above the latter, in the form of a Y having two air outlets 32.1, 32.2 that are connected to the distribution circuit 26 and that are situated above the upper end 28.2 of the body 28.

The withdrawing circuit 22 comprises a plurality of longitudinal ducts 22.1 which extend parallel to the longitudinal direction and which are positioned just below the floor 14, and, for each air inlet 30.1, 30.2 of the mixer 24, a circuit portion 22.3, 22.2 incorporating a filter 34 and a fan 36 configured to generate an airflow in the withdrawing circuit 22 in the direction of the mixer 24. The withdrawing circuit 22 also comprises, for each air inlet 30.1, 30.2 of the mixer 24, an upstream bend 38 connecting the air inlet 30.1, 30.2 and the corresponding circuit portion 22.3, 22.2. In order to limit pressure losses, each upstream bend 38 has a relatively large radius of curvature.

The distribution circuit 26 comprises a plurality of longitudinal ducts 26.1 which extend parallel to the longitudinal direction and which are positioned just below the floor 14, and, for each air outlet 32.1, 32.2 of the mixer 24, a transverse segment 26.2 which is positioned approximately in a transverse plane and which connects one of the air outlets 32.1, 32.2 and at least one longitudinal duct 26.1. Each air outlet 32.1, 32.2 has a downstream bend 40 with a relatively large radius of curvature in order to limit pressure losses.

According to one operating mode, the different parts of the mixer 24 and the different segments of the withdrawing and distribution circuits 22, 26 are introduced one by one into the lower zone 16.2, then connected to one another and to the structures of the fuselage 12 and of the floor 14.

Taking account of the curved shapes of the collector 30, of the exhaust 32 and of the upstream and downstream bends 38, 40, the height H of the body 28 of the mixer 24 (corresponding to the distance separating the lower and upper ends 28.1, 28.2) is limited and can hardly be increased. Since the capacities of the mixer 24 are associated with its height H, the volume of air treated by the mixer 24, for a given dimension under the floor 14, can hardly be increased in spite of the increasing needs for cool air.

The present invention aims to remedy all or some of the drawbacks of the prior art.

SUMMARY OF THE INVENTION

To that end, a subject of the invention is an air conditioning device comprising a withdrawing circuit configured to withdraw air present in a conditioned-air zone, a mixer configured to mix the air withdrawn from the conditioned-air zone with regulated air coming from a regulated-air source, and a distribution circuit configured to re-inject the air exiting the mixer into the conditioned-air zone, the mixer comprising a body extending between lower and upper ends, at least one air inlet connected to the withdrawing circuit and positioned in the vicinity of the lower end, and at least one air outlet connected to the distribution circuit and positioned in the vicinity of the upper end. Herein, the term vicinity of one end is to mean closer to that end than an opposite end, and more preferably, to mean within 25% of a distance from that end as compared to a distance to the other end, and most preferably, to mean within 10% of the distance from that end as compared to the distance to the other end.

According to an aspect of the invention, at least one orifice from among the air inlet and the air outlet is positioned between the lower and upper ends, in the vicinity of one of the lower and upper ends that is closed off by a transverse wall.

According to another aspect of the invention, the body of the mixer comprises an upper part comprising the upper end of the body and a first junction plane, a lower part comprising the lower end of the body and a second junction plane, and a deformable connection system connecting the upper and lower parts in a sealed manner.

This solution makes it possible, with a constant dimension under the floor, to increase the height of the body of the mixer and ultimately its capacity for producing conditioned air.

The dividing of the body of the mixer makes it possible to be able to install the upper and lower parts one after the other, to attach the upper part against the floor and the lower part against the fuselage, and then to connect the two lower and upper parts in a more accessible space that is remote from the fuselage and from the floor. This solution contributes to optimizing the height of the body of the mixer.

This deformable connection system further permits relative movements between the assembled upper and lower parts and makes it possible to reduce the load transfers between these assembled upper and lower parts.

According to another feature, the mixer comprises a plurality of air inlets and a plurality of air outlets, all the air inlets and all the air outlets being positioned between the lower and upper ends. In addition, the lower and upper ends are closed off respectively by lower and upper transverse walls.

According to another feature, the body of the mixer comprises a cylindrical lateral wall, each air outlet being positioned in the vicinity of the upper end of the body, on the lateral wall.

According to another feature, the mixer comprises at least one protrusion that communicates with the body and that is positioned in the vicinity of the lower end of the body, the protrusion having an upper surface oriented toward the upper end of the body, at least one air inlet of the mixer being positioned on the upper surface of the protrusion.

According to another feature, the body being oriented vertically, the first and second junction planes are inclined with respect to a horizontal plane.

According to another feature, the deformable connection system comprises:

a first, flexible sleeve, surrounding the upper and lower parts, having a first zone of overlap overlapping the upper part, a second zone of overlap overlapping the lower part and an intermediate zone connecting the first and second zones of overlap, a second sleeve surrounding the first sleeve, having a rigidity greater than that of the first sleeve and an adjustable diameter, comprising a first end segment at least partially overlapping the first zone of overlap of the first sleeve and a second end segment at least partially overlapping the second zone of overlap of the first sleeve, a first deformable ring positioned between the first zone of overlap of the first sleeve and the first end segment of the second sleeve, a second deformable ring positioned between the second zone of overlap of the first sleeve and the second end segment of the second sleeve.

According to another feature, the deformable connection system comprises at least a first adhesive tape interposed between the upper part and the first zone of overlap of the first sleeve, and at least a second adhesive tape interposed between the lower part and the second zone of overlap of the first sleeve.

According to another feature, the second sleeve comprises a first peripheral recess positioned at the first end segment and configured to accommodate the first deformable ring, and a second peripheral recess positioned at the second end segment and configured to accommodate the second deformable ring.

According to another feature, the air conditioning device comprises a first sub-assembly comprising the upper part of the mixer and a first part of the distribution circuit, this distribution circuit comprising a second part that is not included in the first sub-assembly, and a second sub-assembly comprising the lower part of the mixer and a first part of the withdrawing circuit, this withdrawing circuit comprising a second part that is not included in the second sub-assembly. In addition, each withdrawing or distribution circuit comprises first and second segments that are positioned respectively in the first and second parts of the withdrawing or distribution circuit, the air conditioning device comprising a deformable connection system connecting the first and second segments.

A further subject of the invention is an aircraft comprising an air conditioning device according to one of the preceding features.

According to another feature, the air conditioning device having first and second sub-assemblies, the aircraft comprises a structure and at least one length-adjustable connecting system connecting the first or second sub-assembly and the structure of the aircraft.

A further aspect of the invention is a method for installing an air conditioning device in an aircraft comprising a structure. According to this aspect of the invention, the method comprises a step of assembling first and second sub-assemblies outside the aircraft, a step of installing second parts of the withdrawing and distribution circuits, a step of fitting the first sub-assembly in the aircraft and of fastening the first sub-assembly to the structure of the aircraft, then a step of fitting the second sub-assembly in the aircraft, a step of fastening the second sub-assembly to the structure of the aircraft, a step of connecting upper and lower parts of the body of the mixer, and a step of connecting first and second segments of the first and second parts of the withdrawing and distribution circuits.

BRIEF DESCRIPTION OF THE DRAWINGS

Further features and advantages will become apparent from the following description of the invention, which description is given solely by way of example, with reference to the appended drawings in which.

DETAILED DESCRIPTION OF THE PREFERRED EMBODIMENTS

Figure 1:
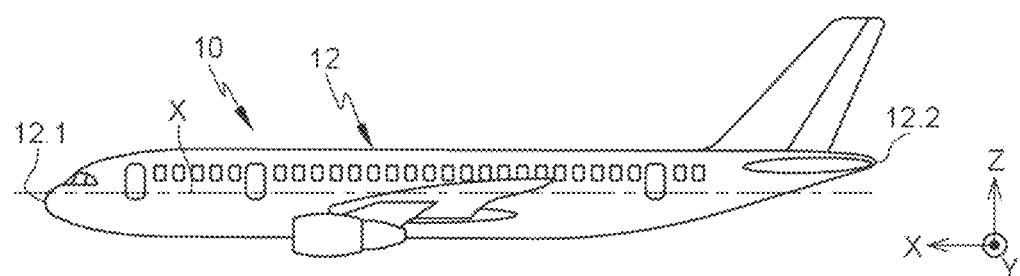
FIG. 1 is a side view of an aircraft.
Figure 2:
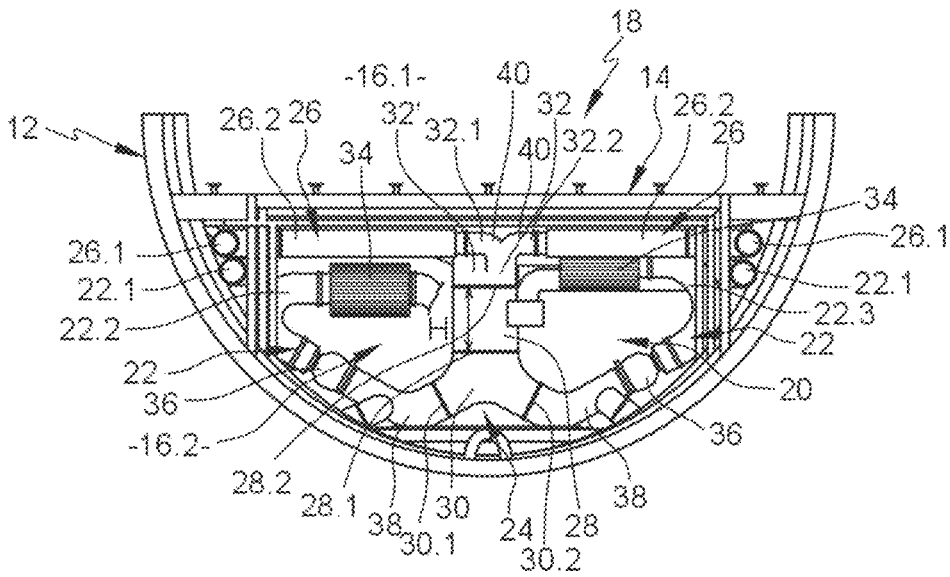
FIG. 2 is a front view of an air conditioning device, illustrating one embodiment of the prior art.
Figure 3:
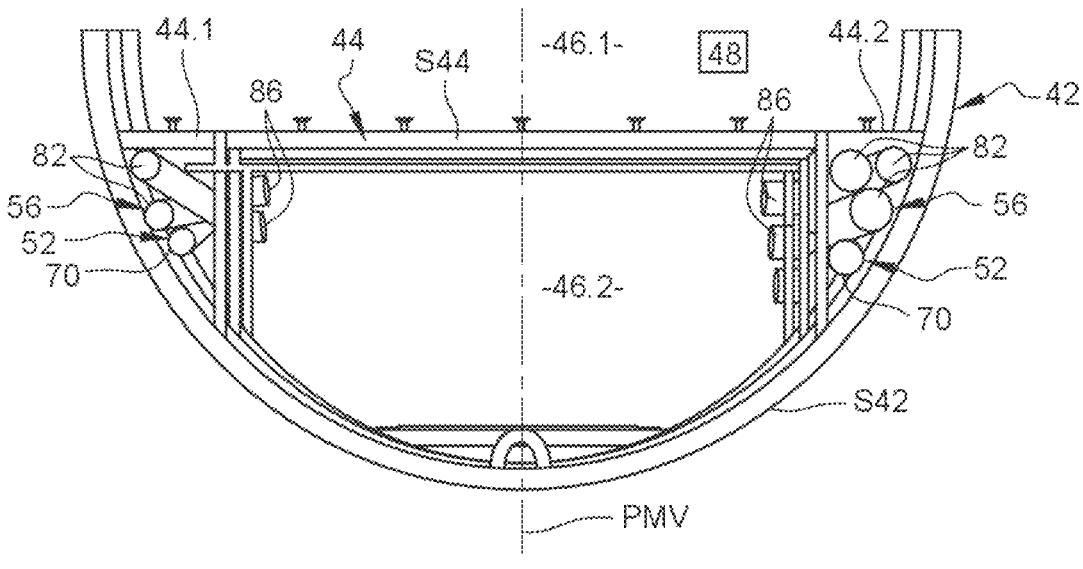
FIG. 3 is a cross section of a part of the fuselage of an aircraft.

According to one embodiment visible in FIGS. 3 and 6, an aircraft comprises a fuselage 42 and a floor 44 which splits the interior of the fuselage 42 into an upper zone 46.1 situated above the floor 44 and a lower zone 46.2 situated below the floor 44. The fuselage 42 comprises a fuselage structure S42 having frames that are positioned in transverse planes. The fuselage 42 has a vertical median plane PMV. The floor 44 comprises a floor structure S44 having transverse and longitudinal beams. The floor 44 extends between first and second longitudinal edges 44.1, 44.2 that are connected to the fuselage 42. Thus, the structure of the aircraft comprises the fuselage structure S42 and the floor structure S44.

The aircraft comprises at least one conditioned-air zone 48, such as a passenger cabin situated in the upper zone 46.1, for example, and an air conditioning device 50 making it possible to regulate, to determined conditions, the air present in the conditioned-air zone 48.

This air conditioning device 50 comprises a withdrawing circuit 52 configured to withdraw air present in the conditioned-air zone 48, a mixer 54 configured to mix the air withdrawn from the conditioned-air zone 48 with regulated air coming from a regulated-air source (not shown), and a distribution circuit 56 configured to re-inject the air exiting the mixer 54 into the conditioned-air zone 48.

Figure 7:
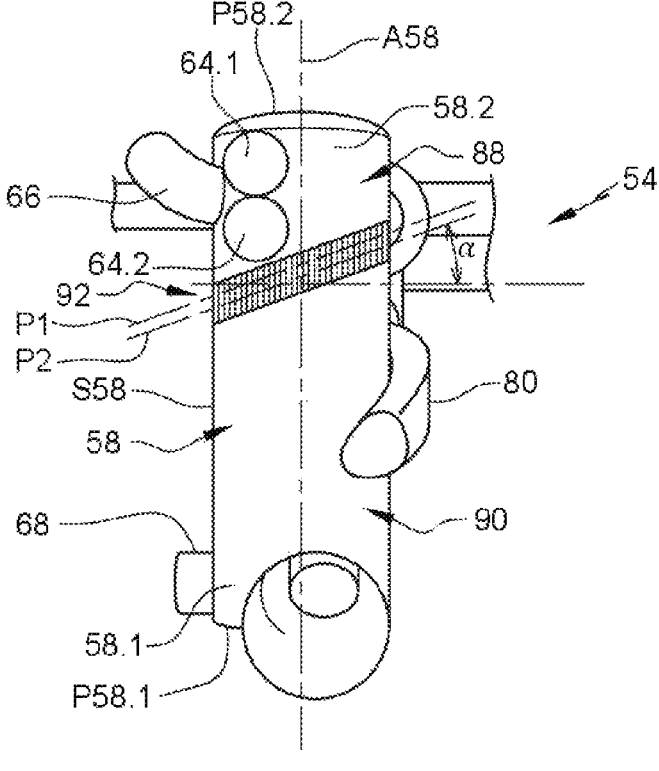
FIG. 7 is a side view of a mixer of the air conditioning device visible in FIG. 6.
Figure 8:
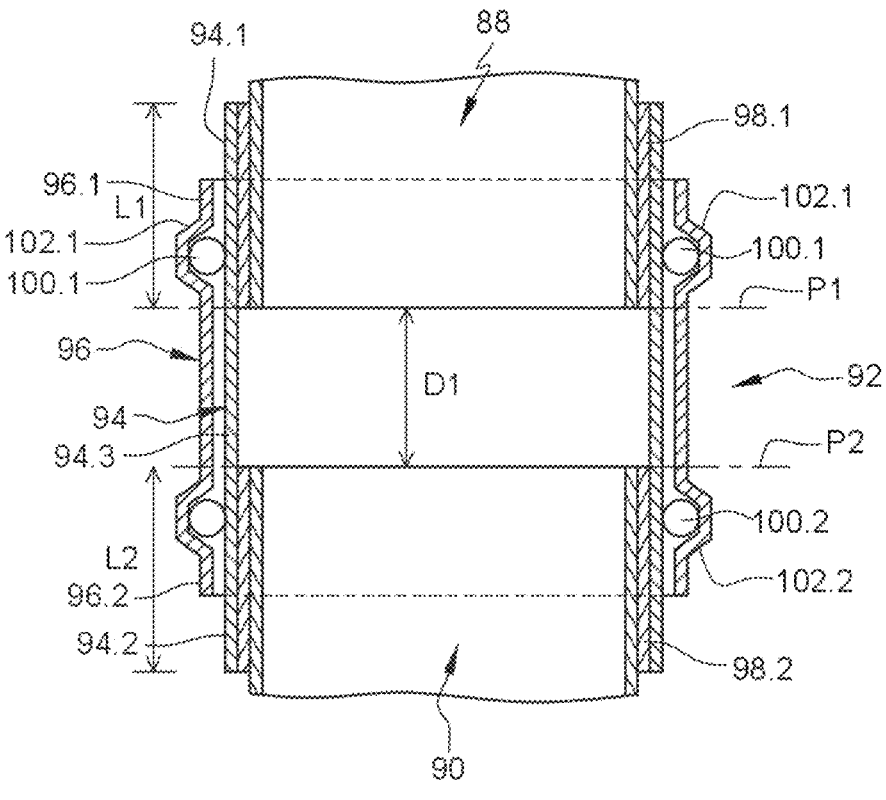
FIG. 8 is a cross section of a system for connecting two parts of a mixer of an air conditioning device, illustrating one embodiment of the invention.

As illustrated in detail in FIG. 7, the mixer 54 has a body 58 which extends between a lower end 58.1 positioned in the vicinity of the fuselage 42 and an upper end 58.2 positioned in the vicinity of the floor 44. The body 58 comprises a cylindrical lateral wall S58 which has a substantially vertical axis A58, a lower transverse wall P58.1 that is oriented toward the fuselage 42 and that closes off the lower end 58.1, and an upper transverse wall P58.2 that is oriented toward the floor 44 and that closes off the upper end 58.2. According to one configuration, the axis A58 is positioned in the vertical median plane PMV of the aircraft.

The mixer 54 also comprises first and second protrusions 60.1, 60.2 that protrude with respect to the lateral wall S58, that are positioned at the lower end 58.1, that are diametrically opposed and that are oriented in a transverse direction. The first and second protrusions 60.1, 60.2 are substantially symmetrical with respect to a longitudinal vertical plane passing through the axis A58 of the body 58 of the mixer 54. Each of the protrusions has a lower surface S1 oriented toward the bottom, in the direction of the fuselage 42, and an upper surface S2 oriented toward the top in the direction of the floor 44.

Each of the first and second protrusions 60.1, 60.2 comprises an internal volume which communicates with the internal volume of the body 58. Each of the protrusions has a horizontal section that is substantially equal to or slightly smaller than a horizontal section of the body 58.

The shapes of the lower transverse wall P58.1 of the body 58 and of the lower surfaces S1 of the first and second protrusions 60.1, 60.2 are configured to conform to the curvature of the fuselage 42.

The mixer 54 comprises at least one air inlet 62.1 connected to the withdrawing circuit 52, at least one air outlet 64.1 connected to the distribution circuit 56, and at least one regulated-air intake 66 connected to the regulated-air source.

Each air inlet 62.1 is positioned at the upper surface S2 of a protrusion 60.1, 60.2 of the mixer 54. Thus, the lower transverse wall P58.1 can be moved as close to the fuselage 42 as possible, this making it possible to increase the height of the body 58 of the mixer 54.

According to one arrangement, the mixer 54 comprises first and second air inlets 62.1, 62.2, the first air inlet 62.1 being positioned at the upper surface S2 of the first protrusion 60.1, the second air inlet 62.2 being positioned at the upper surface S2 of the second protrusion 60.2. According to one configuration, the first and second air inlets 62.1, 62.2 are substantially symmetrical with respect to a longitudinal vertical plane passing through the axis A58 of the body 58 of the mixer 54.

Thus, the mixer 54 comprises at least one protrusion 60.1, 60.2 that communicates with the body 58 and that is positioned in the vicinity of the lower end 58.1 of the body 58, the protrusion 60.1, 60.2 having a volume configured to limit pressure losses, a lower surface S1 oriented toward the fuselage 42, and an upper surface S2 that is opposite to the lower surface S1 and that is oriented toward the upper end 58.2 of the body 58 in the direction of the floor 44, at least one air inlet 62.1, 62.2 being positioned on the upper surface S2. Generally, the mixer comprises one protrusion 60.1, 60.2 for each air inlet 62.1, 62.2, the air inlet 62.1, 62.2 being positioned on the upper surface S2 of the protrusion 60.1, 60.2.

Figure 6:
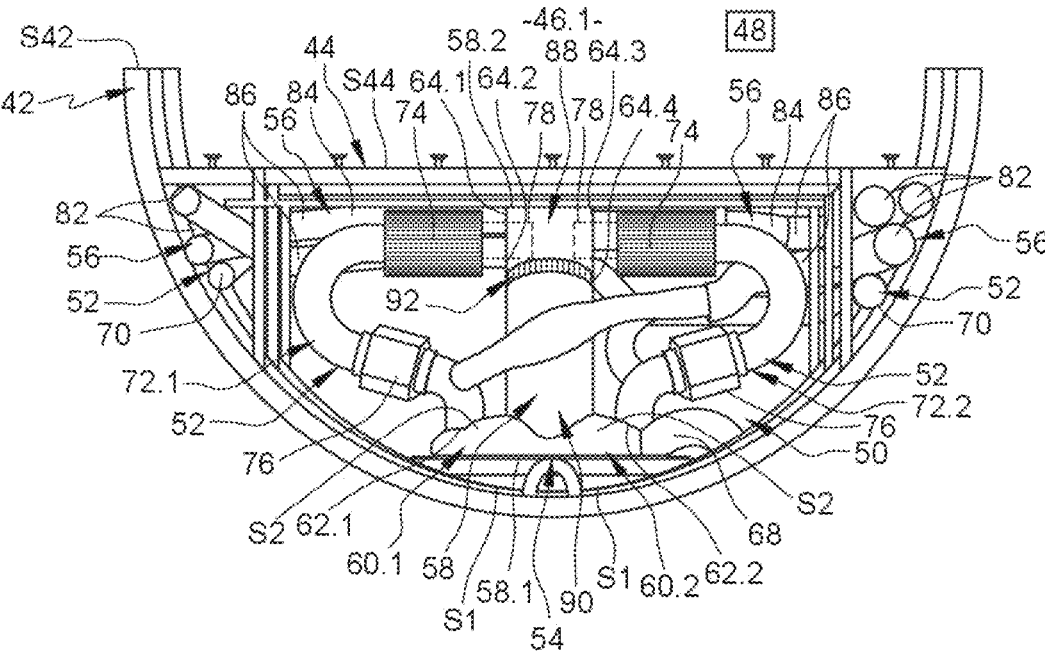
FIG. 6 is a front view of an air conditioning device, illustrating one embodiment of the invention.

According to one embodiment visible in FIGS. 6 and 7, the mixer 54 also comprises an auxiliary air intake 68 connected to an air intake allowing the mixer 54 to be connected to a conditioned-air source (not shown) when the aircraft is on the ground. According to one configuration, this auxiliary air intake 68 may be provided at one of the protrusions 60.1, 60.2. In a variant, as illustrated in FIG. 7, this auxiliary air intake 68 is positioned in the vicinity of the lower end 58.1 of the body 58, at the lateral wall S58, radially offset with respect to the first and second air inlets 62.1, 62.2. By way of indication, the auxiliary air intake 68 is oriented in the longitudinal direction.

According to one particular feature of the invention, each air outlet 64.1 to 64.4 is positioned in the vicinity of the upper end 58.2 of the body 58, at the lateral wall S58. Thus, the upper transverse wall P58.2 can be moved as close to the floor 44 as possible, this making it possible to increase the height of the body 58 of the mixer 54.

According to one arrangement, the mixer 54 comprises four air outlets 64.1 to 64.4 positioned in the vicinity of the upper end 58.2, first and second superposed air outlets 64.1, 64.2 that are oriented transversely toward a first direction, and third and fourth superposed air outlets 64.3, 64.4 that are oriented transversely toward a second direction opposite to the first direction.

According to one configuration, the regulated-air intake 66 is positioned at the lateral wall S58, in the vicinity of the upper end 58.2 of the body 58. According to one arrangement, the regulated-air intake 66 is oriented in the longitudinal direction.

Of course, the invention is not restricted to these embodiments for the mixer 54. Irrespective of the embodiment, the mixer 54 comprises a body 58 extending between lower and upper ends 58.1, 58.2, at least one air inlet 62.1, 62.2 connected to the withdrawing circuit 52 and positioned in the vicinity of the lower end 58.1, and at least one air outlet 64.1 to 64.4 connected to the distribution circuit 56 and positioned in the vicinity of the upper end 58.2, at least one orifice from among the air inlet 62.1, 62.2 and the air outlet 64.1 to 64.4 being positioned between the lower and upper ends 58.1, 58.2, in the vicinity of one of the lower and upper ends 58.1, 58.2 that is closed off by a lower or upper transverse wall P58.1, P58.2. This solution makes it possible to optimize the height of the body 58 of the mixer 54. According to one configuration, all the air inlets 62.1, 62.2 and/or all the air outlets 64.1 to 64.4 are positioned between the lower and upper ends 58.1, 58.2.

The withdrawing circuit 52 comprises at least one longitudinal withdrawing duct 70 which extends parallel to the longitudinal direction and which is positioned below the floor 44, and at least one circuit portion 72.1, 72.2 connecting the longitudinal duct 70 to an air inlet 62.1, 62.2 of the mixer 54.

According to one configuration, the withdrawing circuit 52 comprises a plurality of longitudinal withdrawing ducts 70 that are positioned just below the floor 44, at least one longitudinal withdrawing duct 70 positioned in the vicinity of each of the first and second longitudinal edges 44.1, 44.2 of the floor 44.

According to one configuration, the withdrawing circuit 52 comprises two circuit portions 72.1, 72.2, a first circuit portion 72.1 connected to the first air inlet 62.1, and a second circuit portion 72.2 connected to the second air inlet 62.2. The first and second circuit portions 72.1, 72.2 are positioned on either side of the mixer 54 and oriented approximately in a transverse vertical plane.

Each circuit portion 72.1, 72.2 comprises a filter 74, a fan 76 configured to generate an airflow at least in the withdrawing circuit 52 in the direction of the mixer 54, and at least a first connection segment 78 (shown in part in dashed lines in FIG. 6) connecting the filter 74 to one of the longitudinal withdrawing ducts 70.

According to one arrangement, the first and second circuit portions 72.1, 72.2 are approximately symmetrical with respect to a longitudinal vertical plane passing through the axis A58 of the body 58 of the mixer 54.

Figure 4:
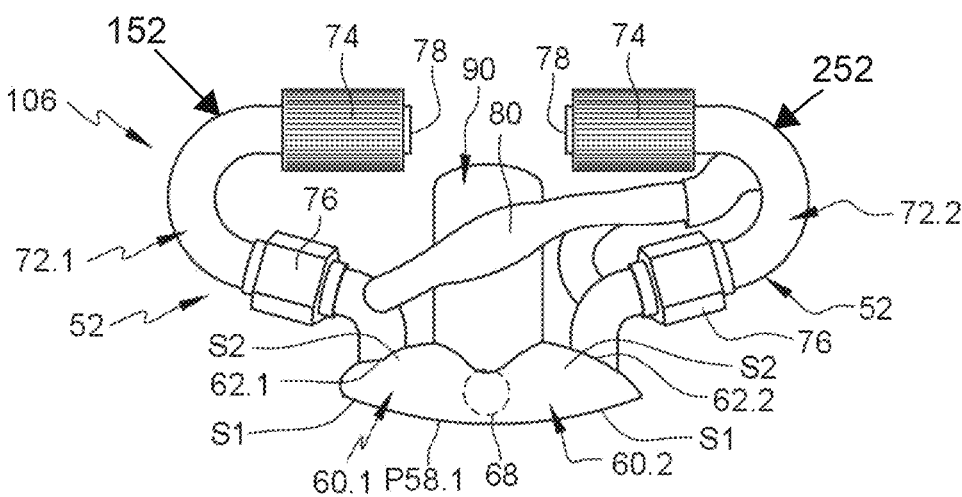
FIG. 4 is a front view of a sub-assembly of an air conditioning device, illustrating one embodiment of the invention.

Of course, the invention is not restricted to this embodiment for the withdrawing circuit 52. As illustrated in FIGS. 4 and 6, the withdrawing circuit 52 may comprise at least one flattened duct 80 attached against the body 58 of the mixer 54.

The distribution circuit 56 comprises at least one longitudinal distribution duct 82 which extends in a longitudinal direction and which is positioned below the floor 44, and at least one transverse segment 84 connecting the longitudinal distribution duct 82 to an air outlet 64.1 to 64.4 of the mixer 54. According to one configuration, the distribution circuit 56 comprises a plurality of longitudinal distribution ducts 82 that are positioned just below the floor 44, at least one longitudinal distribution duct 82 positioned in the vicinity of each of the first and second longitudinal edges 44.1, 44.2 of the floor 44.

According to one arrangement, the distribution circuit 56 comprises a transverse segment 84 for each air outlet 64.1 to 64.4 of the mixer 54, and, for each transverse segment 84, an angled connection duct 86 connecting the transverse segment 84 and at least one longitudinal distribution duct 82.

Of course, the invention is not restricted to this embodiment for the distribution circuit 56.

According to one configuration, the body 58 of the mixer 54 is split into two parts and comprises an upper part 88 comprising the upper end 58.2 of the body 58, all the air outlets 64.1, 64.4 and the regulated-air intake 66, a lower part comprising the lower end 58.1 of the body 58, the protrusion or protrusions 60.2 and all the air inlets 62.1, 62.2, and a deformable connection system 92 connecting the upper and lower parts 88, 90 in a sealed manner. The dividing of the body 58 of the mixer 54 makes it possible to be able to install the upper and lower parts 88, 90 one after the other, to attach the upper part 88 against the floor 44 and the lower part 90 against the fuselage 42, and then to connect the two lower and upper parts 88, 90 in a more accessible space that is remote from the fuselage 42 and from the floor 44. This solution contributes to optimizing the height of the body 58 of the mixer 54.

The upper part 88 has a lower edge positioned in a first junction plane P1. In addition, the lower part 90 has an upper edge positioned in a second junction plane P2. The first and second junction planes P1, P2 are substantially parallel.

According to one configuration, the first and second junction planes P1, P2 are closer to the upper transverse wall P58.2 than to the lower transverse wall P58.1. They are positioned slightly offset toward the bottom with respect to the lowest air outlet 64.1 to 64.4. By way of indication, the upper part 88 has a first dimension measured in the vertical direction Z. The lower part 90 has a second dimension measured in the vertical direction Z that is between 2 to 3 times the first dimension.

According to one arrangement, the body 58 being oriented vertically, the first and second junction planes P1, P2 are inclined with respect to a horizontal plane. This arrangement facilitates the assembly of the upper and lower parts 88, 90 in a space that is limited in terms of height. According to one embodiment, the first and second junction planes P1, P2 form, in a vertical and longitudinal plane (XZ), an angle $\alpha$ of between 10 and 45° with a horizontal plane.

According to one configuration, the first and second junction planes P1 and P2 are spaced apart by a distance D1 greater than 5 mm. Preferably, the distance D1 is of the order of 15 mm. This spacing makes it possible for the upper and lower parts 88, 90 to be able to move with respect to one another.

According to one embodiment, the deformable connection system 92 is configured to allow relative movements between the rigid upper and lower parts 88, 90.

This deformable connection system 92 comprises at least a first, flexible sleeve 94, surrounding the upper and lower parts 88, 90, having a first zone of overlap 94.1 overlapping the lower end of the upper part 88 over a length L1 from the first junction plane P1, a second zone of overlap 94.2 overlapping the upper end of the lower part 90 over a length L2 from the second junction plane P2 and an intermediate zone 94.3 connecting the first and second zones of overlap 94.1, 94.2. According to one configuration, the first sleeve 94 is heat-shrinkable.

According to a preferred embodiment, the flexible connection system 92 is reinforced and comprises a second sleeve 96 surrounding the first sleeve 94.

By way of indication, the lengths L1 and L2 are substantially equal to 50 mm.

According to one embodiment, in order to reinforce the sealing between the first sleeve 94 and the upper and lower parts 88, 90, the deformable connection system 92 comprises at least a first adhesive tape 98.1 which is interposed between the upper part 88 and the first zone of overlap 94.1 of the first sleeve 94 and which extends over the entire periphery of the upper part 88, and at least a second adhesive tape 98.2 which is interposed between the lower part 90 and the second zone of overlap 94.2 of the first sleeve 94 and which extends over the entire periphery of the lower part 90.

The second sleeve 96 may be metallic or be made of plastics material and has an intermediate rigidity, greater than that of the first sleeve 94 but lower than that of the upper and lower parts 88, 90. According to one configuration, the second sleeve 96 has an adjustable diameter.

The second sleeve 96 has a first end segment 96.1 at least partially overlapping the first zone of overlap 94.1 of the first sleeve 94, and a second end segment 96.2 at least partially overlapping the second zone of overlap 94.2 of the first sleeve 94. According to one embodiment, the deformable connection system 92 comprises a first deformable ring 100.1 positioned between the first zone of overlap 94.1 of the first sleeve 94 and the first end segment 96.1 of the second sleeve 96, and a second deformable ring 100.2 positioned between the second zone of overlap 94.2 of the first sleeve 94 and the second end segment 96.2 of the second sleeve 96. These deformable rings 100.1, 100.2 allow a movement between the upper part 88 and the second sleeve 96, and between the lower part 90 and the second sleeve 96. They also make it possible to reduce the load transfers between the upper and lower parts 88, 90. Since the diameter of the second sleeve 96 is adjustable, the second sleeve 96 may be used to compress the deformable rings 100.1, 100.2 slightly.

According to one configuration, the second sleeve 96 comprises a first peripheral recess 102.1, obtained by bending, positioned at the first end segment 96.1 and configured to accommodate the first deformable ring 100.1, and a second peripheral recess 102.2, obtained by bending, positioned at the second end segment 96.2 and configured to accommodate the second deformable ring 100.2.

According to one embodiment, the air conditioning device 50 comprises a first sub-assembly 104 comprising the upper part 88 of the mixer 54 and a first part 156 of the distribution circuit 56, the distribution circuit comprising a second part 256 that is not included in the first sub-assembly 104, and a second sub-assembly 106 comprising the lower part 90 of the mixer 54 and a first part 152 of the withdrawing circuit 52, the withdrawing circuit comprising a second part 252 that is not included in the second sub-assembly 106.

Figure 5:
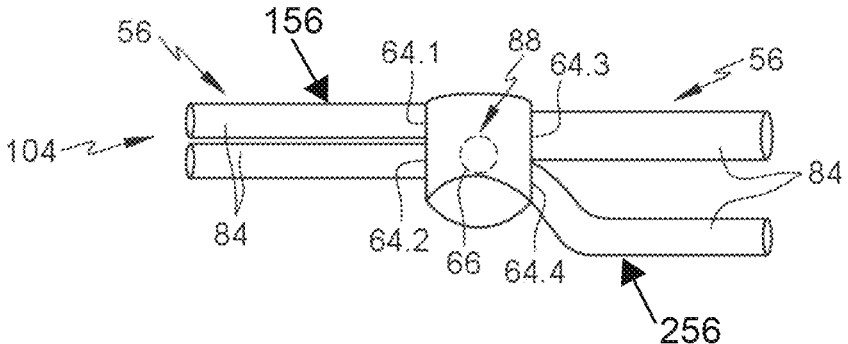
FIG. 5 is a front view of another sub-assembly of an air conditioning device, illustrating one embodiment of the invention.

According to one configuration, the first sub-assembly 104, visible in FIG. 5, comprises the upper part 88 of the mixer 54 and the transverse segments 84 that are connected to the air outlets 64.1 to 64.4 of the mixer 54. This first sub-assembly 104 forms a substantially rigid, one-piece assembly.

According to one operating mode, this first sub-assembly 104 is assembled outside the fuselage 42 and then introduced into the lower zone 46.2 of the fuselage 42.

Prior to the fitting of the first sub-assembly 104, the elements of the second part of the distribution circuit 56, the second part not being included in the first sub-assembly 104, such as the longitudinal distribution ducts 82 and the angled connection ducts 86, for example, are installed and connected to the structure of the aircraft.

Once the first sub-assembly 104 has been positioned and connected to the structure of the aircraft, each transverse segment 84 is connected to the corresponding angled connection duct 86 by a deformable connection system 108. These deformable connection systems 108 allow relative movements between the assembled ducts and make it possible to reduce the load transfers between the assembled ducts. Thus, for each duct straddling the first and second parts of the distribution circuit 56 comprising the first and second segments that are positioned respectively in the first and second parts of the distribution circuit 56, the first and second segments are connected to one another by a deformable connection system 108.

Figure 9:
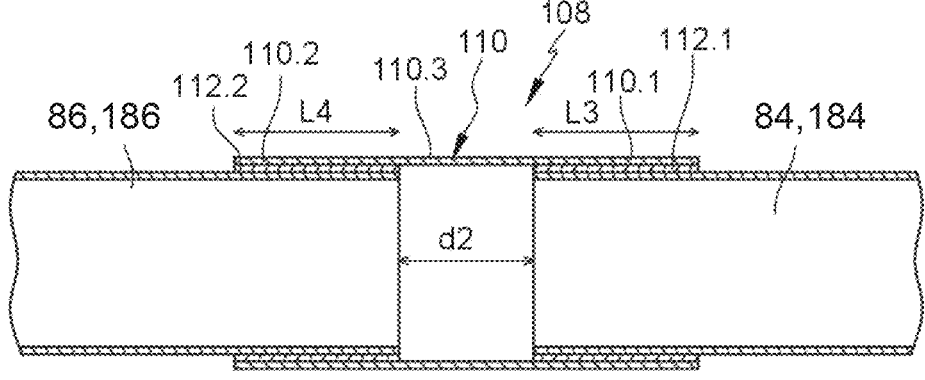
FIG. 9 is a cross section of a system for connecting two ducts of an air conditioning device, illustrating one embodiment of the invention.

According to one embodiment visible in FIG. 9, the deformable connection system 108 comprises a first, flexible sleeve 110, surrounding the transverse segment 84 and the angled connection duct 86, having a first zone of overlap 110.1 overlapping the end of the corresponding transverse segment 84 over a length L3, a second zone of overlap 110.2 overlapping the end of the corresponding angled connection duct 86 over a length L4 and an intermediate zone 110.3 connecting the first and second zones of overlap 110.1, 110.2. According to one configuration, the first sleeve 110 is heat-shrinkable.

By way of indication, the lengths L3 and L4 are substantially equal to 15 mm.

In order to allow them to move with respect one another, the transverse segment 84 and the angled connection duct are spaced apart by a distance greater than or equal to about 5 mm.

According to one embodiment, in order to reinforce the sealing, the deformable connection system 108 comprises at least a first adhesive tape 112.1 interposed between the transverse segment 84 and the first zone of overlap 110.1 of the first sleeve 110, and at least a second adhesive tape 112.2 interposed between the angled connection duct 86 and the second zone of overlap 110.2 of the first sleeve 110.

Figure 10:
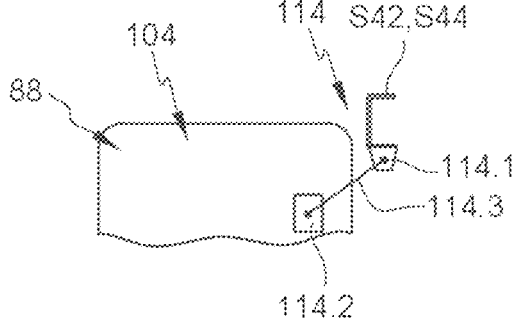
FIG. 10 is a schematic representation of a connecting system between a part of an air conditioning device and a structure of an aircraft, illustrating one embodiment of the invention.

According to one embodiment visible in FIG. 10, the air conditioning device 50 comprises at least one connecting system 114 configured to connect the first sub-assembly 104 to the structure of the aircraft. According to one configuration, the connecting system 114 is length-adjustable. It comprises a first anchoring point 114.1 secured to the structure of the aircraft, a second anchoring point 114.2 secured to the first sub-assembly 104, and a length-adjustable rod 114.3 connecting the first and second anchoring points 114.1, 114.2.

Figure 11:
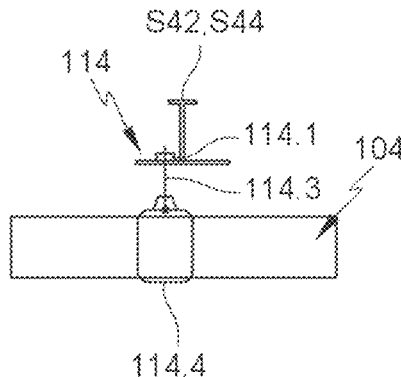
FIG. 11 is a schematic representation of a connecting system between a part of an air conditioning device and a structure of an aircraft, illustrating another embodiment of the invention, and, FIG. 12 is a schematic representation of a method for installing an air conditioning device in an aircraft, illustrating an embodiment of the invention.
Figure 12:
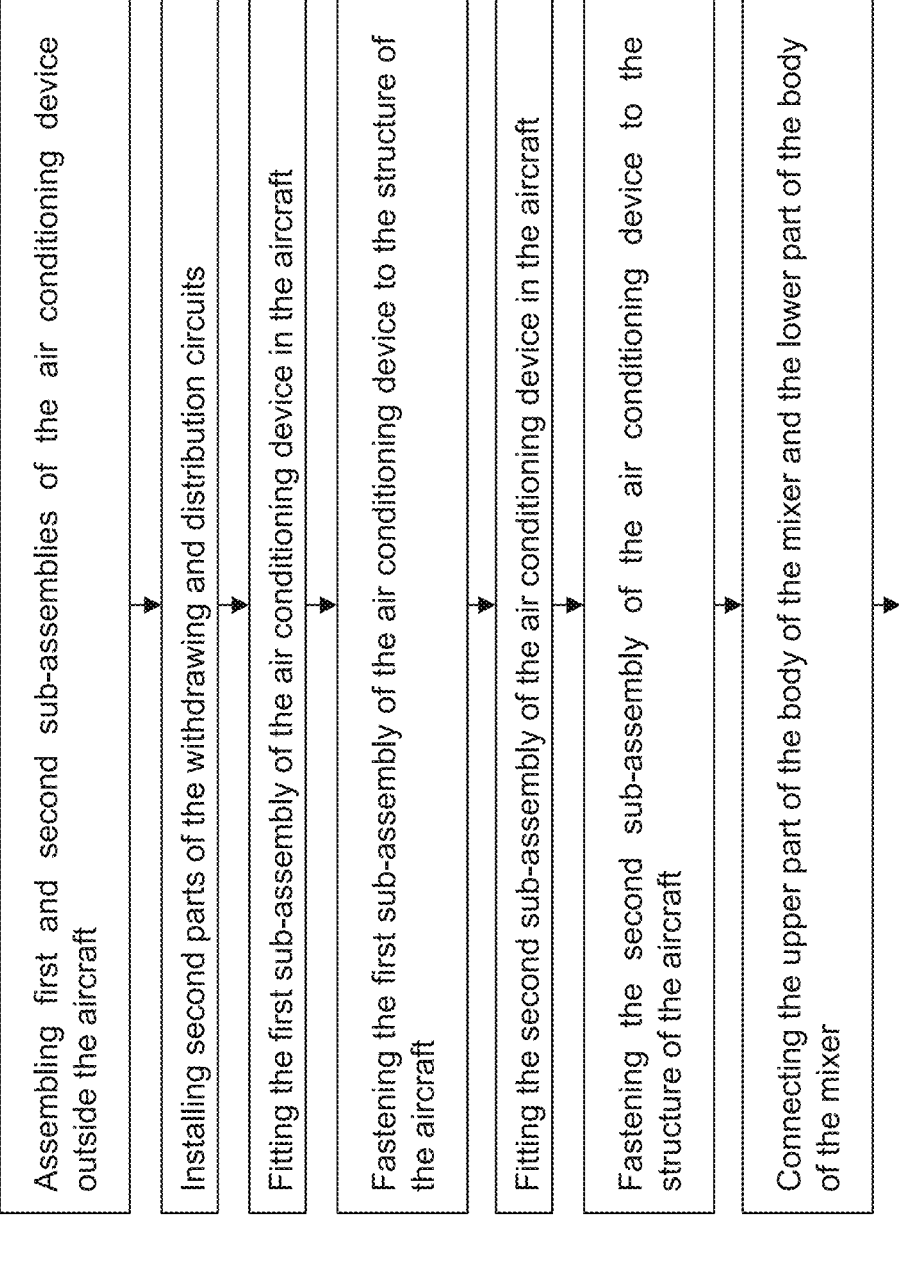

According to another embodiment visible in FIG. 11, the second anchoring point 114.2 is replaced by a collar 114.4 surrounding a duct of the first sub-assembly 104.

According to one configuration visible in FIG. 4, the second sub-assembly 106 comprises the lower part 90 of the mixer 54 and the circuit portions 72.1, 72.2 that are connected to the air inlets 62.1, 62.2 of the mixer 54. This second sub-assembly 106 forms a substantially rigid, one-piece assembly.

According to one operating mode, this second sub-assembly 106 is assembled outside the fuselage 42 and then introduced into the lower zone 46.2 of the fuselage 42. This second sub-assembly 106 is positioned in the fuselage 42 after the fitting and fastening of the first sub-assembly 104 and of the parts of the withdrawing circuit 52 that are not included in the second sub-assembly 106, such as the longitudinal withdrawing ducts 70, for example.

During the installation thereof, the second sub-assembly 106 is positioned with respect to the first sub-assembly 104 and then connected thereto by the deformable connection system 92. Subsequently, for each duct straddling the first and second parts of the withdrawing circuit 52 comprising the first and second segments 184, 186 that are positioned respectively in the first and second parts of the withdrawing circuit 52, the first and second segments 184, 186 are connected to one another by a deformable connection system 108, as illustrated in FIG. 9. Lastly, the second sub-assembly 106 is connected to the structure of the aircraft by at least one length-adjustable connecting system 114, as illustrated in FIGS. 10 and 11. In a variant, the second sub-assembly 106 may be connected to the structure of the aircraft before the upper and lower parts 88, 90 are connected to one another.

Thus, the aircraft comprises at least one length-adjustable connecting system 114 connecting the first or second sub-assembly 104, 106 and the structure of the aircraft.

The provision of two sub-assemblies 104, 106 that are assembled outside the fuselage 42 makes it possible to reduce the intervention time on the assembly line of the aircraft. Since the first and second sub-assemblies 104, 106 are not assembled in a confined area, such as the lower zone 46.2 of the fuselage, the assembly is made easier for the operators.

This disclosure's description of "in the vicinity of" describes a configuration in which an element is closer to one end of the referenced part than another end of the referenced part. Alternatively, "in the vicinity of" may designate an element that is within 10%, 20%, or 30% of the total length of the referenced part. For example, with respect to an embodiment having four air outlets 64.1 to 64.4 positioned in the vicinity of the upper end 58.2, each air outlet 64.1 to 64.4 is thus positioned closer to the upper end 58.2 of the body 58 than the lower end 58.1 of the body 58. Alternatively here, each air outlet 64.1 to 64.4 is positioned closer to upper end 58.2 of the body 58 such that it is within 10%, 20%, or 30% of the total length of the body 58.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An air conditioning device comprising:
a withdrawing circuit configured to withdraw air present in a conditioned-air zone,
a mixer configured to mix the air withdrawn from the conditioned-air zone with regulated air coming from a regulated-air source, and
a distribution circuit configured to re-inject the air exiting the mixer into the conditioned-air zone,
the mixer comprising a body extending between lower and upper ends having at least one air inlet connected to the withdrawing circuit and positioned closer to the lower end than the upper end, and at least one air outlet connected to the distribution circuit and positioned closer to the upper end than the lower end,
wherein one of the lower and upper ends is closed off by a lower or upper transverse wall,
wherein the body of the mixer comprises an upper part comprising the upper end of the body and having a first junction plane, a lower part comprising the lower end of the body and having a second junction plane, and a connection system connecting the upper and lower parts in a sealed manner, the connection system being configured to allow relative movements between the upper and lower parts, and
wherein the connection system comprises:
a first sleeve, surrounding the upper and lower parts, having a first zone of overlap overlapping the upper part, a second zone of overlap overlapping the lower part and an intermediate zone connecting the first and second zones of overlap, the first sleeve having a first rigidity,
a second sleeve surrounding the first sleeve, having a second rigidity greater than the first rigidity of the first sleeve and an adjustable diameter, comprising a first end segment at least partially overlapping the first zone of overlap of the first sleeve and a second end segment at least partially overlapping the second zone of overlap of the first sleeve,
a first ring positioned between the first zone of overlap of the first sleeve and the first end segment of the second sleeve,
a second ring positioned between the second zone of overlap of the first sleeve and the second end segment of the second sleeve.

2. The air conditioning device according to claim 1,
wherein the at least one air inlet comprises a plurality of air inlets and the at least one air outlet comprises a plurality of air outlets,
wherein said plurality of air inlets and said plurality of air outlets are positioned between the lower and upper ends of the body of the mixer, and
wherein the lower and upper ends are closed off respectively by lower and upper transverse walls.

3. The air conditioning device according to claim 1, wherein the body of the mixer further comprises a cylindrical lateral wall, each air outlet being positioned closer to the upper end of the body on the lateral wall than the lower end.

4. The air conditioning device according to claim 1,
wherein the mixer further comprises at least one protrusion that communicates with the body and that is positioned closer to the lower end of the body than the upper end, the protrusion having an upper surface oriented toward the upper end of the body, and
wherein the at least one air inlet of the mixer is positioned on the upper surface of the protrusion.

5. The air conditioning device according to claim 1, wherein, the body is oriented vertically, and the first and second junction planes are inclined with respect to a horizontal plane.

6. The air conditioning device according to claim 1, wherein the connection system further comprises at least a first adhesive tape interposed between the upper part and the first zone of overlap of the first sleeve, and at least a second adhesive tape interposed between the lower part and the second zone of overlap of the first sleeve.

7. The air conditioning device according to claim 1, wherein the second sleeve further comprises a first peripheral recess positioned at the first end segment and configured to accommodate the first ring, and a second peripheral recess positioned at the second end segment and configured to accommodate the second ring.

8. The air conditioning device according to claim 1,
wherein the air conditioning device further comprises a first sub-assembly comprising the upper part of the mixer and a first part of the distribution circuit, this distribution circuit comprising a second part that is not included in the first sub-assembly, and a second sub-assembly comprising the lower part of the mixer and a first part of the withdrawing circuit, the withdrawing circuit comprising a second part that is not included in the second sub-assembly, and wherein at least one of the withdrawing circuit or the distribution circuit further comprises first and second segments that are positioned respectively in the first and second parts of the withdrawing or distribution circuit, the air conditioning device comprising a connection system connecting the first and second segments.

9. An aircraft comprising an air conditioning device according to claim 1, wherein the air conditioning device has first and second sub-assemblies, and wherein the aircraft comprises a structure and at least one length-adjustable connecting system connecting the first sub-assembly or second sub-assembly and the structure of the aircraft.

10. A method for installing an air conditioning device according to claim 8 in an aircraft comprising a structure, wherein the method comprises:

assembling first and second sub-assemblies of the air conditioning device outside the aircraft, installing second parts of the withdrawing and distribution circuits, fitting the first sub-assembly of the air conditioning device in the aircraft and fastening the first sub-assembly of the air conditioning device to the structure of the aircraft, fitting the second sub-assembly of the air conditioning device in the aircraft, fastening the second sub-assembly of the air conditioning device to the structure of the aircraft, connecting the upper part of the body of the mixer and the lower parts of the body of the mixer, connecting the first segment of the first part of the withdrawing and distribution circuits and the second segment of the second part of the withdrawing and distribution circuits.

* * * * *